Dec. 7, 1937.  J. M. REDINGER  2,101,157
LATHE TOOL POST
Filed April 1, 1936
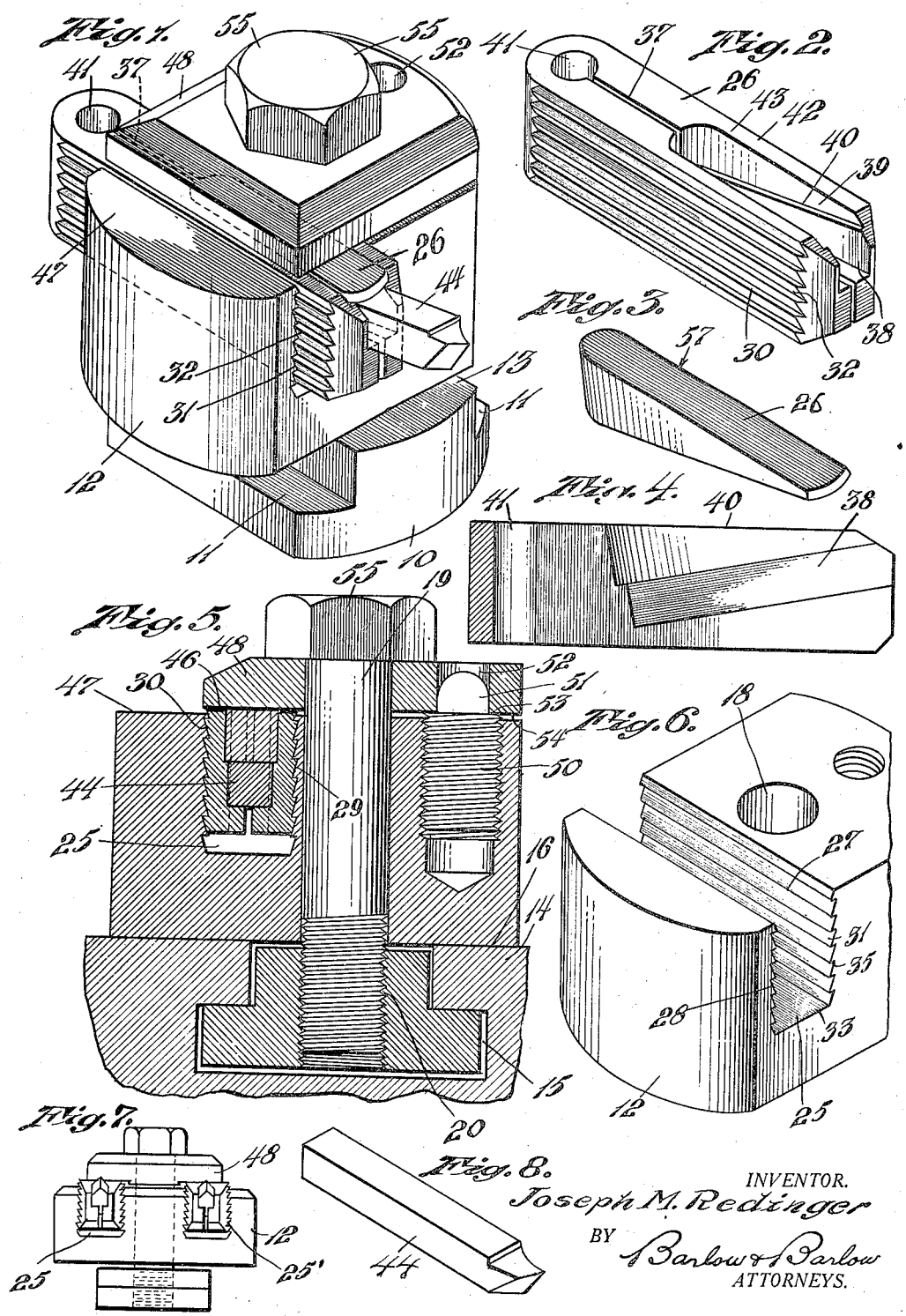
INVENTOR.
Joseph M. Redinger
BY Barlow & Barlow
ATTORNEYS.

Patented Dec. 7, 1937

2,101,157

UNITED STATES PATENT OFFICE 2,101,157

LATHE TOOL POST

Joseph M. Redinger, Johnston, R. I.

Application April 1, 1936, Serial No. 72,010

17 Claims. (Cl. 82—37)

This invention relates to a tool post for a lathe; and has for one of its objects the more rigid holding of a tool than has heretofore been possible with tool posts in common or general use.

Another object of the invention is the provision of a single operable means for binding or clamping all of the moving parts including the tool in the tool holder in position.

Another object of the invention is the provision of a tool post which may be so adjusted as to conveniently present the tool to the work.

Another object of the invention is the provision of a tool post which when in operative position, will provide the maximum vision of the work being operated upon.

Another object of the invention is the provision of a tool post which may carry a plurality of tools, and all of the tools clamped in position by a single operating element with an arrangement such that two cuts one after the other, instead of one large cut may be had.

Another object of the invention is the provision of a tool post which will evenly grip throughout an extended area the tool and the tool holder in the body portion of the post and firmly and securely bind the parts in their relative positions.

With these and other objects in view, the invention consists of certain novel features of construction, as will be more fully described, and particularly pointed out in the appended claims.

In the accompanying drawing:

Fig. 1 is a perspective view of the tool post;

Fig. 2 is a perspective view of the tool holder;

Fig. 3 is a perspective view of the tool clamping block;

Fig. 4 is a sectional view longitudinally thru the center of the tool holder;

Fig. 5 is a sectional view thru the tool holder in the position which it assumes in Fig. 1;

Fig. 6 is a perspective view of the body portion of the post;

Fig. 7 is a front elevational view of a modified form of post showing two tools instead of one tool held in position;

Fig. 8 is a perspective view of the tool.

In the use of lathes it is common commercial practice to clamp a tool in the tool holder and then by the use of another clamp secure the tool holder into the tool post, or use a plurality of clamping devices to secure the tool post and its tool holder and tool in desired position in the tool post carriage of a lathe, and even when maximum pressure has been brought to bear upon the binding parts of the tool post there is a liability of movement of the parts, particularly if a heavy cut is to be taken; and in order to provide a tool post of simpler operation and one which will more firmly hold the tool so that a heavier cut may be obtained on the work than with the use of tool posts which are now in common use, I have provided a recess in the body portion of the tool post in which a tool holder is inserted there being interfitting serrations on the walls of the holder and the recess so that upon relative movement of the tool holder and body the tool holder is locked in its recess; and I have formed the tool holder of resilient stock so that when the locking occurs there will be a movement into binding relation of the tool holder side walls on the tool to firmly hold it in position; while the swivel body of the tool post is at the same time as this binding action occurs firmly held to its base so as to clamp it in position in the slideway of the tool post carriage of the lathe; and the following is a more detailed description of the present embodiment of this invention illustrating the preferred means by which these advantageous results may be accomplished:

With reference to the drawing, 10 designates the base of the tool post which is cut away as at 11 on either side to receive the overhanging portion 14 of the undercut slideway 15 in which the base is mounted in the tool post carriage of a lathe.

The body portion 12 of this post rests upon the upper surface 16 of the slideway in which the base is mounted for binding engagement therewith when the body and base are moved toward each other, as will be presently described.

The body portion 12 is provided with an opening 18 thru which a bolt 19 extends to have threaded engagement in the opening 20 in the base. The body portion 12 may be swiveled about the bolt 19 as an axis.

A recess 25 is provided in the body 12 at one side of the opening 18 for the reception of the tool holder 26 in this recess.

This tool holder 26 is split longitudinally as at 37 and provided with a recess 38 enlarged at its top as at 39 to provide a shoulder 40 along its opposite sides. This recess extends at an angle of 10 degrees to the bottom surface of the tool holder, as does also the shoulder 40. A hole 41 is provided at the end of this split 37 for convenience in manufacture and to allow a better opportunity for the sides 42 and 43 to flex toward each other.

A tool 44 is of a size to snugly fit the recess 38 in the tool holder and extend above the shoulder, and when the same is inserted there will be a slight spreading of the portions 42 and 43 so as to afford a good frictional fit for engagement with and gripping the tool 44. The tool or bit 44 may be of different sizes and the recess 38 should also be of different sizes for the accommodation of differently sized tools.

The opposite side walls 27 and 28 of the recess 25 and the opposite side walls 29 and 30 of the tool holder 26 are provided with interfitting serrations. These serrations present engaging surfaces as 31 and 32 which are inclined toward the opposite side wall of the recess and each of these surfaces, tapers towards the bottom wall 33 of the recess 25 so that if the tool holder should be moved downwardly in the recess towards the bottom wall 33, the surfaces 31 and 32 would cause a pressure on the walls 29 and 30 tending to move them toward each other. There are edge portions 35 connecting the inclined portions 31 and 32, which are in planes parallel to the bottom wall 33 of the recess.

By the arrangement of the interfitting serrations shown, a tool holder may be variously positioned in the recess 25 so as to cause its top surface 46 to project different distances above the top surface 47 of the body 12. In order to apply pressure upon the tool and tool holder, I provide a locking cap and pressure plate 48 having an opening through it for the reception of a bolt 19 and which is adapted to engage with the upper surface 26 of the tapered block 57 which is located on top of the tool in said recess 38 in the tool holder and extends slightly thereabove. As the tool holder will extend above the surface 47 of the body 12 on one side of the clamping bolt 19 in order to support the plate on the opposite side of the bolt 19, I have provided a threaded member 50 having a stud portion 51 entering a hole 52 in the plate 48 while its upper surface 53 engages the underside 54 of the plate to suitably support it. I so arrange threads on the member 50 that there will be twelve threads to the inch, while the serrations are six to the inch, thus two complete revolutions of the member 50 will be equal to a movement equivalent to that of one of the serrations and a suitable gauge for determining the accuracy of the height of the member 50 may be provided if desired. Should it be desired to place the tool holder so that its surface 46 will be below the surface 47 of the body, I will then add another block on top of the block 57 of the tool holder positioned so that the upper surface of the added block will project above the surface 27 of the body for the reception of pressure by the plate 48.

*In operation*

The tool or bit 44 will be inserted into the recess 38 of the tool holder which, when the tool is fresh, will extend substantially the length of the recess. The tool holder will then be positioned in the recess 25 in the body 12, preferably with its surface slightly above the body, as shown in Fig. 5, although it may be adjusted to a higher position or lower position if desired. The body 12 may be adjusted so as to provide the correct angle for the tool with reference to the work and the base 10 will be slid into its guide to proper position. The plate will be located over the tool holder, as shown in Figs. 1 and 5, with the member 50 suitably adjusted to the height of the holder and the head 55 of the bolt 19 will be turned to draw up the base so that it will engage the overhanging portion 14 and at the same time pressure will be applied through the plate 48 in the block 57 to force the tool downwardly in the tool holder to cause the tool holder to move slightly in the recess, bind the tool therein and bind the tool holder in the body and at the same time force the body downwardly against the surface 16 in the slideways so as to bind the post in position, all by merely turning upon the head 55 with a suitable wrench. If it is desired that the tool shall take an angle opposite to that which would present the edge of the recess nearest to the work, the tool holder may be withdrawn, the body 12 swiveled about the bolt 19 and the tool holder inserted from the opposite side of the recess 25. Thus, I may bring either edge of the body 12 to the work in an angular relation.

As the tool 44 is used up and becomes shorter it will be moved outwardly in the recess 38 and the block 57 will rest on the shoulder 40 at the inner end of the recess for support.

In some cases, instead of having a recess and tool holder on one side only of the bolt 19, I may provide a similar recess on either side of the bolt 19, as I have shown at 25, 25' in Fig. 7. In this case, in operation two tool holders would be positioned at substantially the same height above the body 12, while the plate 48 is brought into engagement with the holders for the binding action which is to be had in a similar manner to that above described.

In the use of a tool holder post, two cuts may be performed on the work, one after the other, rather than one heavy cut which for some purposes is better. Of course, in the case where two tool holders are used, an action is provided on the plate 48 and it is unnecessary to provide the threaded number 50 which is described above in connection with the single tool holder.

Instead of the use of a tool holder and tool, the tool itself, such as a boring tool may have provided thereon serrations to fit into the recess 25 to be gripped therein in the same manner as the tool holder is gripped, all as will be readily apparent. It will be also be apparent that the slots 25 and 25' may be different distances apart.

By the use of these plates 48, merely the head of the bolt extends above the plate and there is no upstanding projection in the vision of the operator in viewing the operation of the tool upon the work, which in addition to the binding of the parts in a very secure relation by reason of the long, staggered, tapered surface affords an advantage which readily appeals to the machinist, while the ease in operation by use of a single nut for tightening or loosening the parts also will have its ready appeal.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A lathe tool post comprising a base to slidably engage the tool post carriage of a lathe, a body movably mounted thereon, a resilient tool holder in said body having an opening for the reception of a tool, and means including a single operable element for binding the tool in the holder and the parts against movement one with relation to the other.

2. A lathe tool post comprising a base to slidably engage the tool post carriage of a lathe, a body swivelly, mounted thereon and having a recess for the reception of a tool holder, a resilient tool holder in the recess of said body having an opening for the reception of a tool, and means including a single operable element for binding the tool in the holder and the parts against movement one with relation to the other.

3. In a lathe tool post provided with a recess therein having side walls and a bottom wall at substantially right angles to said side walls, a tool holder in said recess having an opening for the reception of a tool and providing substantially parallel opposite side walls for engaging the opposite sides of a tool, and means for moving said opposite side walls toward each other to grip and bind a tool in said opening.

4. In a lathe tool post provided with a recess therein having side walls and a bottom wall at substantially right angles to said side walls, a tool holder in said recess having an opening for the reception of a tool and providing substantially parallel opposite side walls for engaging the opposite sides of a tool, and means for relatively moving said opposite side walls toward each other to grip and bind a tool in said opening.

5. In a lathe tool post provided with a recess therein having side walls and a bottom wall at substantially right angles to said side walls, a tool holder in said recess having an opening for the reception of a tool and providing substantially parallel opposite side walls resiliently connected together, for engaging the opposite sides of a tool, and means for moving said opposite side walls toward each other to grip and bind a tool in said opening.

6. In a lathe tool post provided with a recess therein having side walls and a bottom wall at substantially right angles to said side walls, a tool holder in said recess having an opening for the reception of a tool and providing substantially parallel opposite side walls resiliently connected together for engaging the opposite sides of a tool, and means applying pressure on the outside of said tool holder for moving said opposite side walls toward each other to grip and bind a tool in said opening.

7. In a lathe tool post, a tool holder having an opening for the reception of a tool and providing opposite side walls for engaging the opposite sides of a tool, the outer surface of said tool holder on opposite sides each having portions presenting a plurality of tapered surfaces in converging planes, cooperating means engaging said surfaces, and means to effect a relative movement of said tapered surfaces and cooperating means for applying pressure to move the said side walls toward each other to grip and bind a tool in said opening.

8. In a lathe tool post, a tool holder having an opening for the reception of a tool and providing opposite side walls for engaging the opposite sides of a tool, the outer surface of said tool holder on opposite sides having portions presenting staggered tapered surfaces, the surfaces on opposite sides being in converging planes, cooperating means engaging said surfaces, and means to effect a relative movement of said tapered surfaces and cooperating means for applying pressure to move the said side walls toward each other to grip and bind a tool in said opening.

9. In a lathe tool post, a body member having a recess therein, a tool holder member in said recess, cooperating interfitting serrations on the walls of said recess and said holder member to effect a compression on said tool holder member upon relative movement of said members.

10. In a lathe tool post, a body member having a recess therein, a tool holder member in said recess, cooperating means between the walls of said recess and said holder member to effect a compression on said tool holder member upon relative movement of said members, and means for moving said holder member relative to the body member.

11. In a lathe tool post, a body member having a recess therein, a tool holder member in said recess with walls resiliently movable toward each other, cooperating means between the walls of said recess and said holder member to effect a compression on said tool holder member upon relative movement of said members, and means for moving said holder member relative to the body member, comprising a plate engaging said holder member and a threaded member engaging said plate.

12. In a lathe tool post, a body member having a recess therein with spaced side walls, a tool holder in said recess, complemental series of interfitting serrations on one of said side walls and said holder, said serrations presenting engaging surfaces inclined toward the opposite wall of the recess, and means to move said holder relative to said body to move said engaging surfaces into firm relationship.

13. In a lathe tool post a body member having a recess therein with spaced side walls, a tool holder in said recess, complemental series of interfitting serrations on both of said side walls and said holder, said serrations presenting engaging surfaces inclined toward the opposite wall of the recess, and means to move said holder relative to said body to move said engaging surfaces into firm relationship.

14. In a lathe tool post, a body member having a recess therein with spaced side walls, a tool holder having resiliently compressible sides in said recess, complemental series of interfitting serrations on one of said side walls and said holder, said serrations presenting engaging surfaces inclined toward the opposite wall of the recess, and means to move said holder relative to said body to move said engaging surfaces into firm relationship and at the same time compress said sides to grip a tool in the tool holder.

15. A lathe tool holder comprising a portion to engage a part of the lathe, a portion having a recess therein for the reception of a tool holder provided with an opening for the reception of a cutting tool, a cutting tool in said holder, and means including a single operable element to bind all of said portions and cutting tool against relative movement to said lathe.

16. A tool holder comprising a plurality of relatively movable parts, cooperating means between said parts to effect a binding of said movable parts upon a relative movement thereof, a tool in one of said parts, and means including an element engaging said tool for applying pressure thereon and through said tool effecting a relative movement of said parts to cause a binding thereof against movement.

17. A tool holder comprising a member provided with a recess therein, a tool holder in said recess and having an opening therein providing movable opposite side walls, a tool in said opening, cooperating means between the walls of said recess and said holder to effect a compression on said movable opposite side walls upon a relative movement of said members, and means for exerting a pressure on said tool for causing a relative movement between said member and said tool holder to move said side walls towards each other to bind said tool in said opening.

JOSEPH M. REDINGER.